United States Patent
Yanagita

(10) Patent No.: US 6,360,143 B1
(45) Date of Patent: Mar. 19, 2002

(54) ERROR RECOVERY METHODS FOR CONTROLLING ROBOTIC SYSTEMS

(75) Inventor: Akihiro Yanagita, Orion Township, MI (US)

(73) Assignee: Fanuc Robotics North America, Rochester Hills, MI (US)

(*) Notice: Subject to any disclaimer, the term of this patent is extended or adjusted under 35 U.S.C. 154(b) by 0 days.

(21) Appl. No.: 09/844,462

(22) Filed: Apr. 27, 2001

(51) Int. Cl.[7] .............................................. G06F 19/00
(52) U.S. Cl. ...................... 700/245; 700/161; 700/167; 700/184; 700/195; 700/86; 700/193; 700/180; 700/182; 700/260; 700/261; 700/262; 700/249; 318/615; 318/561; 318/569; 318/573; 318/609; 318/560; 104/53; 104/55; 104/76; 104/568.2; 104/88.01; 72/57; 72/60; 72/82; 72/84; 72/94; 72/121
(58) Field of Search .......................... 700/160, 86, 159, 700/167, 184, 195, 193, 180, 182, 190, 260–262, 245, 249, 252; 318/560, 615, 561, 569, 573, 609, 610; 104/53, 55, 76, 568.2, 88.01; 72/57, 60, 82, 84, 94, 121

(56) References Cited

U.S. PATENT DOCUMENTS

| | | |
|---|---|---|
| 4,786,847 A | 11/1988 | Daggett et al. |
| 4,864,204 A | 9/1989 | Daggett et al. |
| 4,908,556 A | 3/1990 | Daggett et al. |
| 5,161,101 A * | 11/1992 | Nishiyama et al. ........... 700/86 |
| 5,170,034 A | 12/1992 | Seshimo et al. |
| 5,269,567 A * | 12/1993 | Kubota et al. ................ 700/53 |
| 5,373,321 A | 12/1994 | Fukuoka et al. |
| 5,423,372 A * | 6/1995 | Keaney ...................... 606/130 |
| RE35,010 E | 8/1995 | Price |
| 5,521,829 A * | 5/1996 | Jeon ........................... 700/161 |
| 5,540,946 A | 7/1996 | DeVries et al. |
| 5,630,955 A | 5/1997 | Kosaka et al. |
| 5,636,127 A * | 6/1997 | Aoki et al. .................. 700/167 |
| 5,666,325 A | 9/1997 | Belser et al. |
| 5,901,650 A * | 5/1999 | Turner et al. ............. 104/88.01 |
| 5,903,459 A | 5/1999 | Greenwood et al. |
| 6,112,605 A | 9/2000 | Papen et al. |

FOREIGN PATENT DOCUMENTS

JP      2001150150 A  *  6/2001

OTHER PUBLICATIONS

Jarabek et al., Robot positoin servoing using visual gap, 1998, IEEE, pp. 26–30.*

Ming–chine et al., A knowledge–based vision system for identification overlaping objects, 1988, IEEE, pp. 658–660.*

* cited by examiner

*Primary Examiner*—William A. Cuchlinski, Jr.
*Assistant Examiner*—McDieunel Marc
(74) *Attorney, Agent, or Firm*—Howard & Howard

(57) ABSTRACT

A method of controlling a dispensing system, having a robot that moves along a motion segment and applies a material to a workpiece, automatically determines a backup distance for the robot after an error has occurred during the dispensing of a first portion of the material. The backup distance is based on an operational speed of the robot. The robot is relocated to a backup position based on this backup distance to ensure that the robot reaches the operational speed at least by a time that the robot reaches a re-application position. The re-application position is at or near where the application of the first portion of the material ended. Therefore, gaps, overlaps, and puddles in the material on the workpiece are prevented.

45 Claims, 3 Drawing Sheets

ERROR RECOVERY METHODS FOR CONTROLLING ROBOTIC SYSTEMS

FIELD OF THE INVENTION

The subject invention relates to methods of controlling dispensing systems having a robot for application of a material to a workpiece. Specifically, the methods of controlling the dispensing systems prevent any gaps, overlaps, or puddles in the material on the workpiece.

BACKGROUND OF THE INVENTION

Many industries apply a material to a workpiece during manufacturing to accommodate a multitude of processes. For example, manufacturers may apply the material to a workpiece to prevent any moisture or contaminants from entering a cavity formed when combining two or more workpieces. The material is typically applied by a conventional dispensing system that includes a specialized robot. The robot applies the material to a workpiece as the robot moves along a motion segment at an operational speed. Application of the material to the workpiece is automated, and manufacturer specifications governing the application of materials allow few, if any, gaps, overlaps, or puddles in the material on the workpiece. A gap in the material creates such problems as the intrusion of moisture or contaminants into the cavity formed when combining two or more workpieces. Overlaps or puddles in the material causes an uneven fit between the workpieces.

When an error occurs in the dispensing system, the gaps, overlaps, and puddles in the material occur. Current dispensing systems have the ability to detect when the error has occurred as the robot moves along a motion segment at an operational speed. The dispensing systems of the prior art are programmed to discontinue dispensing a first portion of the material when the error is detected. An operator may also discontinue dispensing a first portion of the material manually. Regardless of how dispensing is discontinued, the robot decelerates from the operational speed to a rest position after the dispensing is discontinued. The rest position is generally beyond the position along the motion segment at which the application of the first portion of the material ended. Therefore, if dispensing resumes from the rest position, a gap occurs in the material on the workpiece.

Current dispensing systems overcome this problem by determining a backup distance, by relocating the robot to a backup position along the motion segment based on the backup distance, and by setting a time to resume dispensing. These steps are performed to ensure that the robot applies a second portion of the material at a reapplication position that is at or near where the application of the first portion of the material ended, and also to ensure that the robot reaches the operational speed at least by the time the robot reaches the re-application position. Otherwise, a gap or overlap in the material on the workpiece occurs. Additionally, a puddle of the material on the workpiece may occur if the robot has not reached the operational speed. Further, if the robot is improperly relocated to the backup position, or if the time to resume dispensing is improperly set, the gap, overlap, or puddle in the material also occurs.

The disadvantage of the prior art is the method in which the dispensing system is controlled to prevent the gaps and overlaps in the material on the workpiece. The backup distance and time to resume dispensing are not based on the operational speed of the robot in the prior art methods. As such, the backup distance and time to resume dispensing must be adjusted by trial and error for each operational speed of the robot. Otherwise, there is no reasonable assurance that the re-application position will be at or near where the application of the first portion of the material ended or that the operational speed of the robot will be reached at least by a time that the robot reaches the re-application position. In view of the fact that the method of the prior art can not be used for different operational speeds of the robot, the prior art method realizes high costs associated with adjusting the backup distance and time to resume dispensing for each operational speed. Additionally, the robot used in the prior art methods is limited to only one application.

As a result, it is desirable to develop a method that automatically determines the backup distance based on the operational speed of the robot thereby eliminating the requirement of setting the time to resume dispensing. Determining the backup distance based on the operational speed prevents any gaps or overlaps from occurring in the material during the application of the material to the workpiece.

SUMMARY OF THE INVENTION AND ADVANTAGES

A method of controlling a dispensing system is disclosed. The dispensing system includes a robot for application of a material to a workpiece. The method of controlling the dispensing system according to the subject invention prevents any gaps or overlaps in the material on the workpiece. The method of the subject invention also prevents any puddles of the material on the workpiece. The method includes the step of moving the robot along a motion segment at an operational speed between a first position and a second position. As the robot moves, a first portion of the material is applied to the workpiece. The application of the first portion of the material is discontinued in response to an error that occurs during the application of the first portion. A re-application position for the material, indicating where the robot begins applying a second portion of the material, is established along the motion segment in response to the error. The method of the subject invention continues by determining a backup distance indicating where the robot is to be relocated relative to the re-application position. The backup distance is based on the operational speed of the robot to ensure that the robot reaches the operational speed at least by a time that the robot reaches the re-application position. The method of the subject invention then continues by relocating the robot to a backup position based on the determined backup distance.

The subject invention also provides a method for controlling a dispensing system that includes the steps above, but further includes establishing a tracking position for the robot along the motion segment. The tracking position is established in response to the error that occurs during the application of the first portion. The tracking position relates to the re-application position and is used to establish the re-application position. The method continues by monitoring the tracking position as the robot moves from the backup position toward the reapplication position to instruct the robot to begin application of a second portion of the material to the workpiece at the re-application position. As such gaps, overlaps, and puddles in the material on the workpiece are prevented.

An intelligent error-recovery method is also disclosed. The method is for controlling a system including the robot to ensure that an operational parameter is achieved after the error occurs in the system. The robot moves along an operating path between the first position and the second position and performs an operation as the robot moves. The operation being performed requires the operational parameter to ensure that the operation is completed. The operation being performed with the robot is discontinued in response to the error, and a transitional position is established when the error occurs. The transitional position indicates a location of the robot along the operating path when the error occurs. The robot is relocated to a restart position after the error occurs and the robot moves from the restart position toward the second position. The intelligent error-recovery method of the subject invention verifies that the operational parameter is achieved at least by a time the transitional position is reached by the robot to ensure that the operation is completed by the robot.

The advantage of the subject invention over the prior art is the method in which the robot is controlled to prevent any gaps, overlaps, or puddles in the material on the workpiece. In the prior art, the backup distance and time to resume dispensing are variables that must be adjusted by trial and error for each operational speed of the robot. On the other hand, the method of the subject invention automatically determines the backup distance based on the operational speed of the robot to ensure that the re-application position is at or near where the application of the first portion of the material ended and also to ensure that the operational speed of the robot is reached at least by a time that the robot reaches the re-application position. As such, the method of the subject invention is able to be used across many different applications that utilize various operational speeds of the robot to prevent any gaps, overlaps, or puddles in the material on the workpiece.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
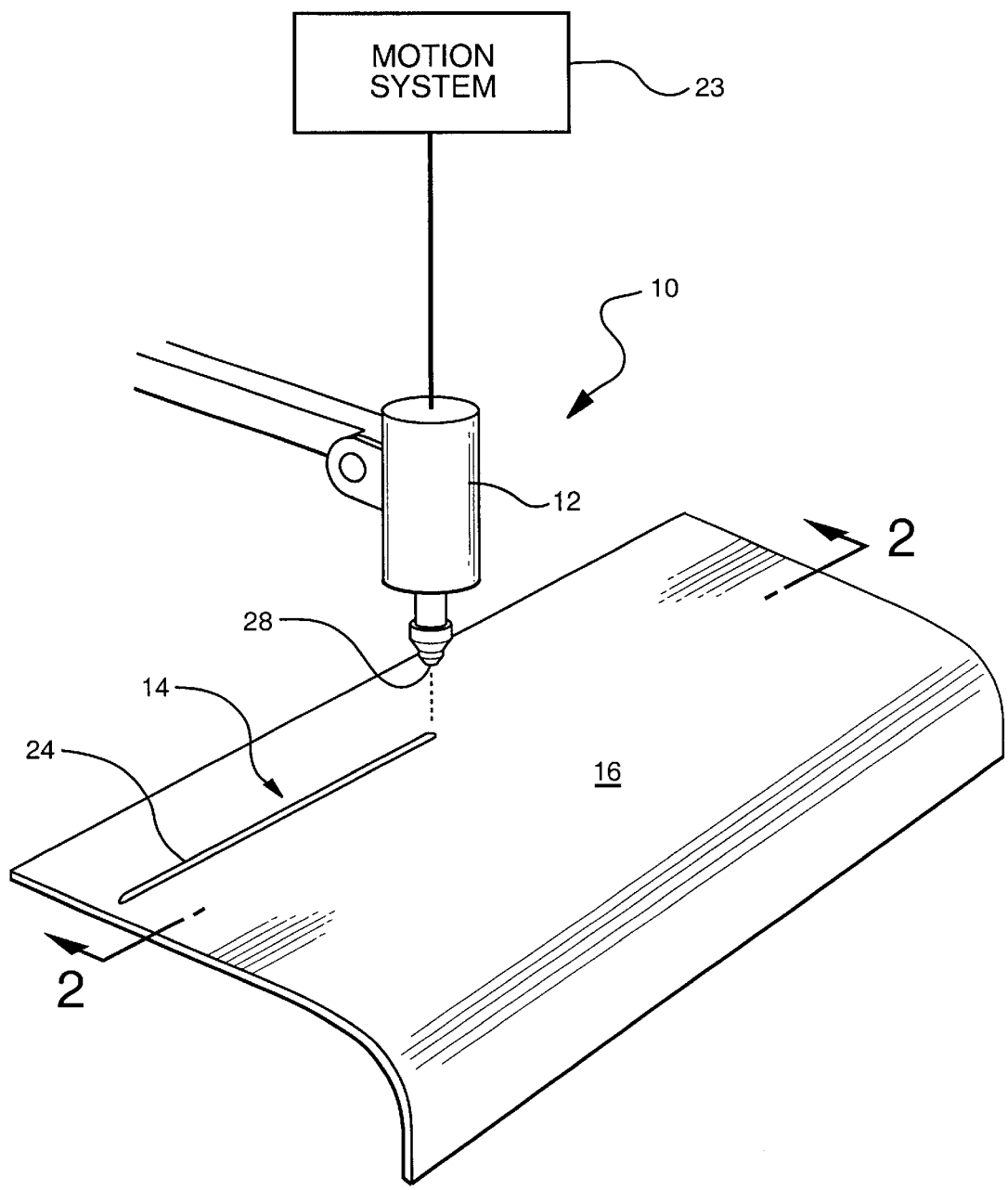
FIG. 1 is a perspective view of a robot applying a first portion of a material to a workpiece.

Referring to the Figures, wherein like numerals indicate like or corresponding parts throughout the several views, a method of controlling a dispensing system 10 is disclosed. The dispensing system 10 includes a robot 12 that applies a material 14 to a workpiece 16 as shown in FIG. 1. The method of controlling the dispensing system 10 according to the subject invention prevents any gaps or overlaps in the material 14 on the workpiece 16. The method of controlling the dispensing system 10 also prevents any puddles of the material 14 from being deposited on the workpiece 16. It is to be understood throughout that a puddle of the material 14 is where an excess amount of the material 14 is deposited on the workpiece 16. The term 'overlap' in the material 14 may be used throughout to also describe puddles of the material 14.

Figure 2:
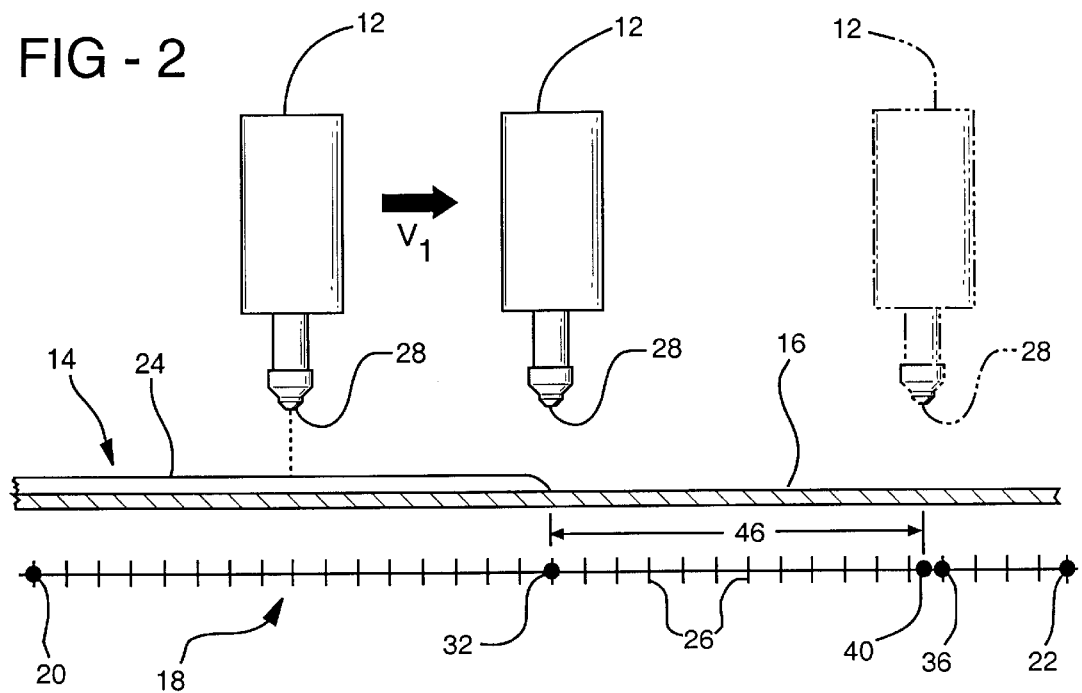
FIG. 2 is an elevational side view of the robot taken along line 2—2 of FIG. 1 illustrating the robot applying a first portion of a material to a workpiece along a motion segment, discontinuing application of the first portion in response to an error that occurs during application of the first portion, and stopping at a rest position along the motion segment.

Referring to FIGS. 2, the method of the subject invention includes the step of moving the robot 12 along a motion segment 18 at an operational speed $V_1$ between a first position 20 and a second position 22. As understood by those skilled in the art, movement of the robot 12 is controlled by a motion system 23 comprising a robot controller, an interpolator, a digital filter and a servo system. For illustrative purposes, the motion system 23 is shown schematically in FIG. 1. The robot 12 applies the material 14 to the workpiece 16 as the robot 12 moves along the motion segment 18. For descriptive purposes, the method will be described to apply a first portion 24 of the material 14 to the workpiece 16. It is to be understood that applying a material includes, but is not limited to, dispensing a bead of sealant, dispensing a paint or primer, applying an adhesive, and the like.

To facilitate the movement of the robot 12 along the motion segment 18, a plurality of intermediate positions 26 are interpolated between the first and second positions 20, 22. The robot 12 is controlled to move along the successively interpolated intermediate positions 26 at the same rate that the intermediate positions 26 are interpolated thereby creating a direct correlation between the amount of interpolation that has been completed and an amount of progress that the robot 12 has made moving along the motion segment 18. In other words, while the robot 12 is moving at an operational speed $V_1$ along the motion segment 18, a distance between the robot 12 and the intermediate position that was most recently interpolated is constant. In the preferred embodiment, interpolation intervals of the intermediate positions 26 can range between 4 to 20 milliseconds depending on capabilities of the robot controller. Of course, the interpolation intervals can range outside of 4 to 20 milliseconds without varying the scope of the subject invention. In the preferred embodiment, the robot 12 moves between successive intermediate positions 26 at a fixed interpolation interval. It is to be understood that the entire motion segment 18 could be interpolated before movement of the robot 12 begins and that interpolating the intermediate positions 26 as the robot 12 moves is not intended to be limiting.

A segment fraction value is determined at each interpolated intermediate position 26 for the robot 12 as each interpolated intermediate position 26 is interpolated. It is well known in the art that the segment fraction values of the interpolated intermediate positions 26 can also be determined prior to moving the robot 12, therefore, the time when the segment fraction values at each interpolated intermediate position 26 are determined is not intended to limit the subject invention. The segment fraction value is a percentage of the motion segment 18 defined between the first and second positions 20, 22. For example, the segment fraction value at the first position 20 is 0% and the segment fraction value at the second position 22 is 100%. As previously mentioned, the percentage of the motion segment 18 that has been interpolated corresponds to the amount of progress that the robot 12 has made along the motion segment 18. Hence, determining the segment fraction value at each interpolated intermediate position 26 immediately after the intermediate position 26 has been interpolated provides a relationship between the robot 12 and the determined segment fraction value.

A purpose of the subject invention is to control the dispensing system 10 in response to an error that occurs during the application of the material 14. As such, application of the first portion 24 of the material 14 is discontinued in response to the error that occurs during the application of the first portion 24 as depicted in FIG. 2. In the preferred embodiment, the step of discontinuing the application of the first portion 24 of the material 14 is defined as closing a material supply valve 28 of the robot 12 to prevent the material 14 from being dispensed from the robot 12. It is to be understood that the error that occurs can include intentional shutdowns, poor material consistency, empty or low material supply, mechanical failure, operational failure, etc. Furthermore, discontinuing the application of the first portion 24 can occur after the error is detected through a detection system that may include a sensor 30 (shown schematically in FIG. 4) suitable for detecting the particular error.

The method continues by establishing a re-application position 32 for the material 14 along the motion segment 18 in response to the error. The re-application position 32 indicates where the robot 12 begins applying a second portion 34 of the material 14. In the preferred embodiment, the step of establishing the re-application position 32 relies on the step of establishing a tracking position 36 for the robot 12 along the motion segment 18 in response to the error that occurs during the application of the first portion 24. The importance of the tracking position 36 will be set forth in greater detail below. In the preferred embodiment, the tracking position 36 is an interpolated intermediate position 26 that is interpolated by the interpolator immediately after the time that the error occurs. The segment fraction value of the tracking position 36 is subsequently recorded. As previously described, the amount of interpolation that has been completed while moving the robot 12 along the motion segment 18 can be directly related to the amount of progress that the robot 12 has made along the motion segment 18. Therefore, the segment fraction value of the tracking position 36 can be directly related to the amount of progress that the robot 12 made along the motion segment 18 when the application of the first portion 24 was discontinued. As will be discussed further below, a second portion 34 of the material 14 is applied at or near where the application of the first portion 24 was discontinued to prevent gaps and overlaps in the material 14 on the workpiece 16. Therefore, establishing the tracking position 36 further completes the step of establishing a re-application position 32 for the material 14.

The subject invention continues by instructing the robot 12 to stop movement in response to the error. The robot 12 decelerates from the operational speed $V_1$ at or near the re-application position 32 until the robot 12 stops movement at a rest position 40, as shown in FIG. 2. This step may include, but is not limited to, shutting off power to the servo system, disengaging a drive mechanism of the robot 12, or applying a mechanical brake to the robot 12. In general, the rest position 40 of the robot 12 does not coincide with any of the interpolated intermediate positions 26 along the motion segment 18. In the preferred embodiment, the interpolated intermediate position 26 that succeeds the rest position 40 is the tracking position 36.

Figure 3:
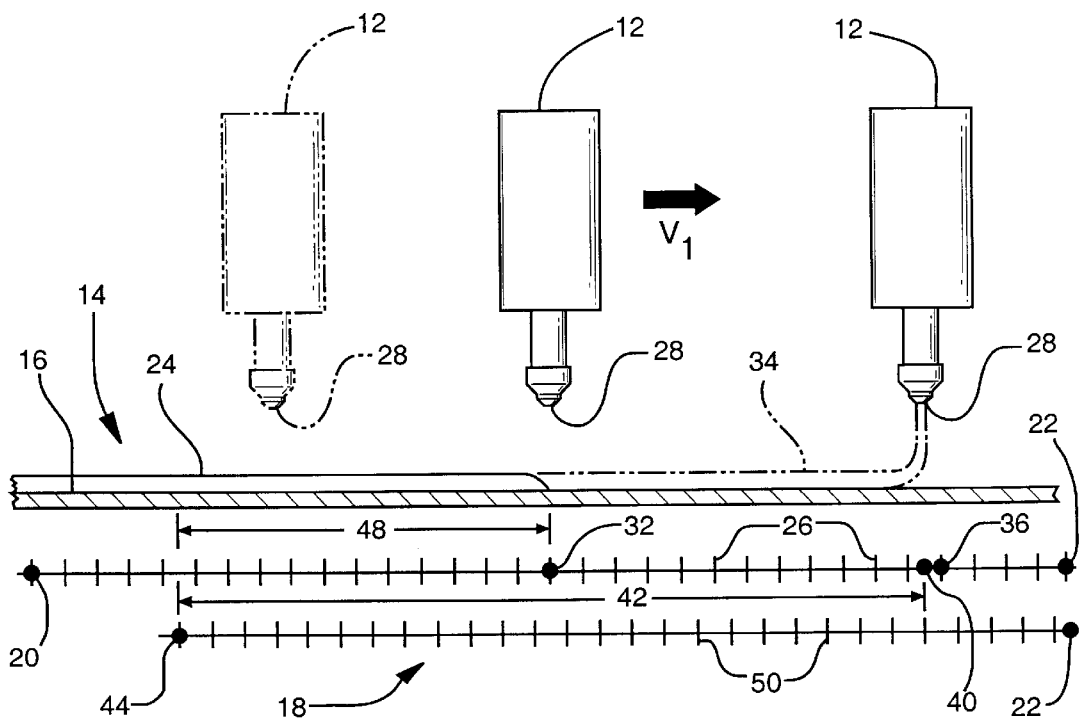
FIG. 3 is an elevational side view of the robot taken along line 2—2 of FIG. 1 illustrating the robot being relocated to a backup position and applying a second portion of the material at the re-application position.

If the robot 12 was to begin dispensing the second portion 34 of the material 14 at the rest position 40, a gap forms. As such, the method continues by automatically determining a backup distance 42, as shown in FIG. 3, for the robot 12 to determine where to relocate the robot 12 relative to the re-application position 32. The backup distance 42 is based on the operational speed $V_1$ of the robot 12 to ensure that the robot 12 reaches the operational speed $V_1$ at least by a time that the robot 12 reaches the re-application position 32 to prevent any gaps, overlaps, or puddles in the material 14 on the workpiece 16. Once the backup distance 42 is automatically determined, the robot 12 is relocated to a backup position 44 based on the automatically determined backup distance 42. For descriptive purposes, the motion segment 18 has been divided into two separate lines, however, it is to be understood that there is only one motion segment 18 in the described embodiments. It is to be understood that, in other actual applications of the subject invention, dispensing of the material 14 may occur over several motion segments 18.

In the preferred embodiment, two steps are required to automatically determine the backup distance 42. First, a deceleration distance 46 of the robot 12 is automatically determined. The deceleration distance 46 represents a distance along the motion segment 18 between the re-application position 32 and the rest position 40 of the robot 12. Second, an acceleration distance 48 of the robot 12 is automatically determined. The acceleration distance 48 represents a distance along the motion segment 18 between the backup position 44 of the robot 12 and the re-application position 32 of the robot 12. The backup distance 42 is determined to be at least a sum of the deceleration distance 46 and the acceleration distance 48. This sum ensures that the robot 12 reaches the operational speed $V_1$ prior to reaching the re-application position 32 to prevent any gaps, overlaps, or puddles in the material 14 on the workpiece 16. The method in the preferred embodiment continues by relocating the robot 12 to the backup position 44 based on the sum of the deceleration distance 46 and the acceleration distance 48.

Referring to FIG. 3, once the robot 12 has been relocated to the backup position 44, the method continues by moving the robot 12 from the backup position 44 toward the re-application position 32 along the motion segment 18. This can be further defined in the preferred embodiment as accelerating the robot 12 from the backup position 44 toward the re-application position 32 such that the robot 12 achieves the operational speed $V_1$ prior to reaching the re-application position 32. The method continues by interpolating a second plurality of intermediate positions 50 for the robot 12, as shown in FIG. 3, and segment fraction values are determined for each of these second intermediate positions 50 as the robot 12 moves from the backup position 44. This is performed in the same manner as described above for the first plurality of intermediate positions 26. The second plurality of intermediate positions 50 may not match the location of the first plurality of intermediate positions 26, but in the preferred embodiment, each interpolation interval between the intermediate positions 26, 50 in the first and the second plurality are the same. Segment fraction values for both the first and second plurality of intermediate positions 26, 50 are based on the percentage of interpolation completed between the first position 20 and the second position 22.

The method continues by monitoring the tracking position 36 as the robot 12 moves from the backup position 44 toward the re-application position 32. Monitoring the tracking position 36 enables the dispensing system 10 to instruct the robot 12 to begin application of the second portion 34 of the material 14 to the workpiece 16 at the re-application position 32. More specifically, the controller monitors the recorded segment fraction value of the tracking position 36 as the robot 12 moves from the backup position 44 toward the re-application position 32. The dispensing system 10 compares the recorded segment fraction value of the tracking position 36 with the determined segment fraction value of each of the second plurality of intermediate positions 50 as they are interpolated. As previously described, the second plurality of intermediate positions 50 are interpolated as the robot 12 moves along the motion segment 18. When the segment fraction value of an intermediate position 50 of the second plurality equals or exceeds the recorded segment fraction value of the tracking position 36, the second portion 34 of the material 14 is applied to the workpiece 16 at the re-application position 32. The second portion 34 is applied at the re-application position 32 because the step of determining the backup distance 42 to be the sum of the acceleration distance 48 and the deceleration distance 46 ensures that the operational speed $V_1$ has already been achieved. Application of the second portion 34 of the material 14 is shown in FIG. 3. In the preferred embodiment, the material supply valve 28 of the robot 12 is opened at the re-application position 32 after the robot 12 reaches the operational speed $V_1$ to dispense the second portion 34 of the material 14 from the robot 12.

Figure 4:
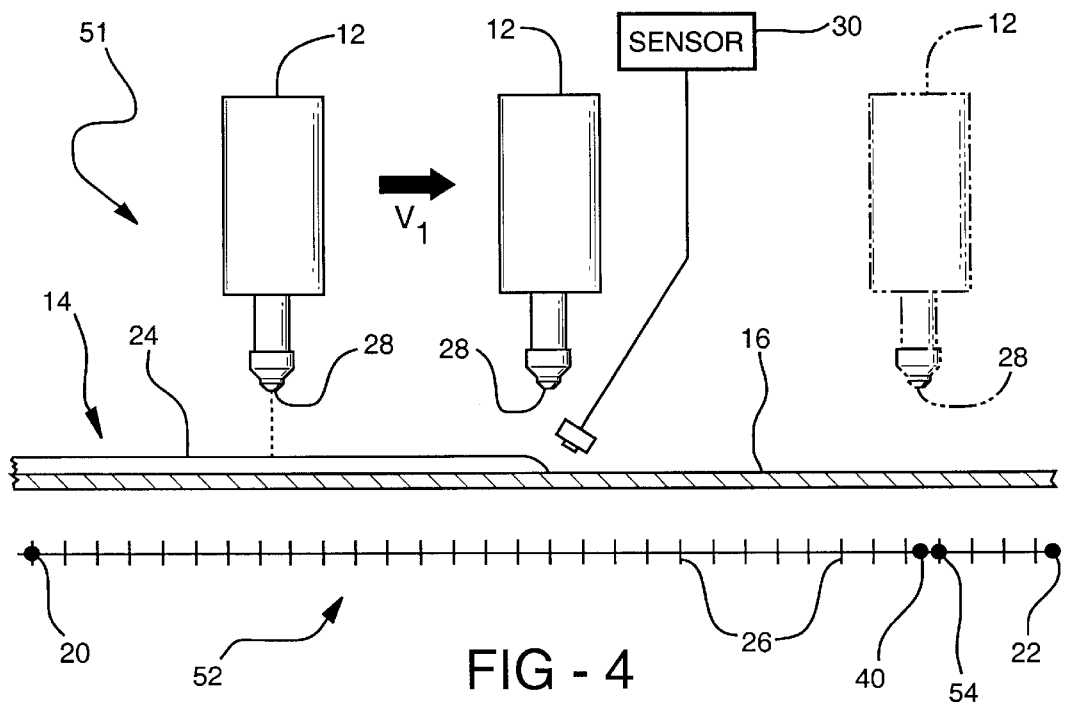
FIG. 4 is an elevational side view of the robot taken along line 2—2 of FIG. 1 illustrating the robot moving along an operating path, performing an operation, and discontinuing the operation.
Figure 5:
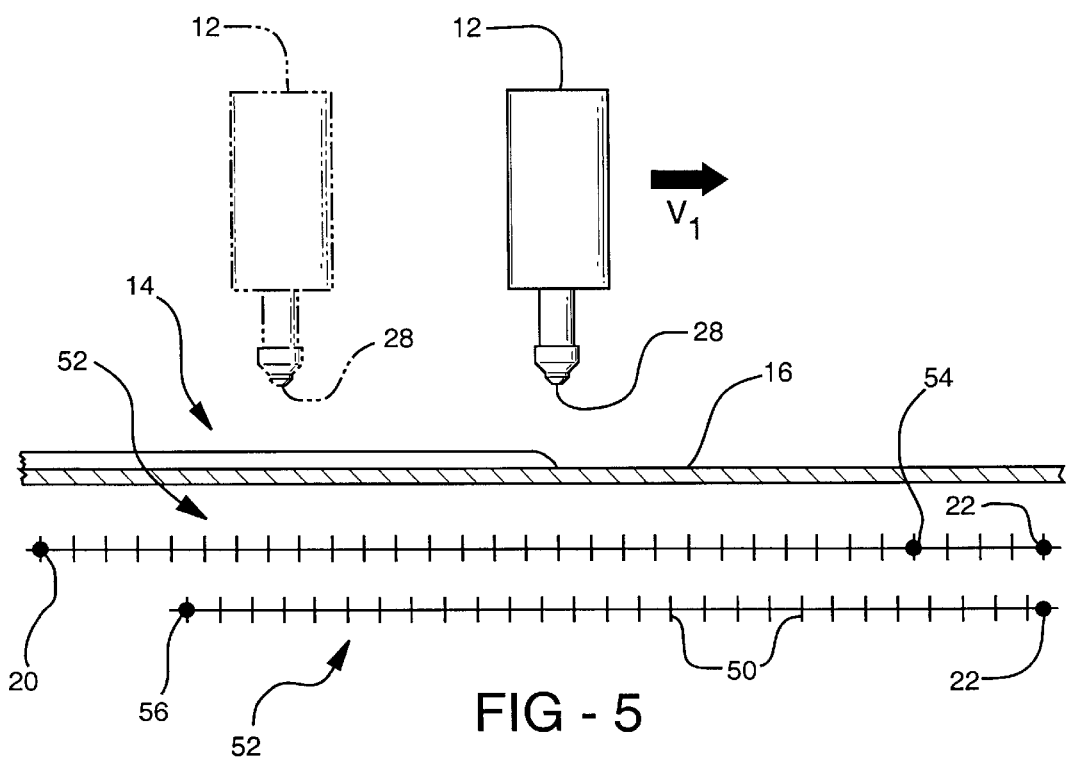
FIG. 5 is an elevational side view of the robot taken along line 2—2 of FIG. 1 illustrating the robot being relocated to a restart position and moving from the restart position toward a second position.

Referring to FIGS. 4 and 5, an alternative embodiment directed to an intelligent error-recovery method is also disclosed. The method is for controlling a system 51 including the robot 12 to ensure that an operational parameter $V_1$ is achieved after the error occurs in the system 51. It is to be understood that the alternative embodiment is not limited to dispensing systems. The alternative embodiment may be used in welding operations, cutting systems, heating operations, and the like. The method of the alternative embodiment begins by moving the robot 12 along an operating path 52 between the first and second positions 20, 22. The method of the alternative embodiment continues by performing an operation with the robot 12 as the robot 12 moves. For descriptive purposes, FIGS. 4 and 5 illustrate the operation as being the dispensing of the material 14, however, this is not intended to limit the alternative embodiment. The operation of the alternative embodiment may include, but is not limited to dispensing, welding, cutting, heating, and the like. The operation includes an operational parameter $V_1$ to ensure that the operation is completed. For descriptive purposes, FIGS. 4 and 5 illustrate the operational parameter $V_1$ as being the operational speed $V_1$, however, the operational parameter $V_1$ may include, but is not limited to, a material dimension, a temperature, a rate, a speed of the robot 12, a location of the robot 12, and the like. This alternative embodiment also includes the step of interpolating the plurality of intermediate positions 26 for the robot 12 between the first position 20 and the second position 22. The manner in which the interpolation is completed is the same as in the preferred embodiment. In addition, the movement of the robot 12 between successive intermediate positions 26 along the operating path 52 is as described in the preferred embodiment.

The alternative embodiment also includes the step of detecting an error occurring in the system 51 as the robot 12 performs the operation. Detecting the error occurring in the system 51 is described as detecting the error occurring in the system 51 with the sensor 30 as the robot 12 performs the operation. The alternative embodiment discontinues the operation performed with the robot 12 in response to the detected error. Discontinuing the operation may include, but is not limited to shutting off power to the servo system, disengaging a drive mechanism of the robot 12, applying a brake to the robot 12, closing a valve, shutting off a heat supply, shutting off a gas supply, discontinuing a welding arc, and the like.

The alternative embodiment continues by establishing a transitional position 54 when the error occurs. The transitional position 54 indicates a location of the robot 12 along the operating path 52 when the error occurs. Establishing the transitional position 54 more specifically includes the steps of determining a segment fraction value of the transitional position 54 and recording the determined segment fraction value of this transitional position 54. The steps of determining the segment fraction value of the transitional position 54 and recording the determined segment fraction value of the transitional position 54 are described above in the preferred embodiment in terms of the tracking position 36.

The alternative embodiment also includes the step of stopping movement of the robot 12 in response to the error that occurs. The robot 12 stops movement by, but not limited to, the manners suggested in the preferred embodiment. The robot 12 is relocated to a restart position 56 in response to the error that occurs. Once the robot 12 has been relocated to the restart position 56, the method continues by moving the robot 12 from the restart position 56 toward the second position 22. Moving the robot 12 from the restart position 56 toward the second position 22 also includes the step of interpolating a second plurality of intermediate positions 50, as in the preferred embodiment. The method continues by monitoring the recorded segment fraction value of the transitional position 54 as the robot 12 moves from the restart position 56 toward the second position 22. The step of monitoring the recorded segment fraction value of the transitional position 54 is accomplished in the same manner as monitoring the recorded segment fraction value of the tracking position 36 of the preferred embodiment. When the segment fraction value of an intermediate position 50 of the second plurality equals or exceeds the recorded segment fraction value of the transitional position 54, the method verifies that the operational parameter $V_1$ is achieved. Upon verification, the operation of the robot 12 is then completed.

The subject invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A method of controlling a dispensing system having a robot for application of a material to a workpiece wherein the dispensing system prevents any gaps or overlaps in the material on the workpiece, said method comprising the steps of:

moving the robot along a motion segment at an operational speed between a first position and a second position;

applying a first portion of the material to the workpiece as the robot moves along the motion segment;

discontinuing the application of the first portion of the material in response to an error that occurs during the application of the first portion;

establishing a re-application position for the material along the motion segment in response to the error that occurs during the application of the first portion, wherein the re-application position indicates where the robot begins applying a second portion of the material;

determining a backup distance indicating where the robot is relocated relative to the re-application position;

relocating the robot to a backup position based on the determined backup distance;

said method characterized by automatically determining the backup distance based on the operational speed of the robot to ensure that the robot reaches the operational speed at least by a time that the robot reaches the re-application position to prevent any gaps or overlaps in the material on the workpiece.

2. A method as set forth in claim 1 further including the step of instructing the robot to stop movement in response to the error, wherein the instruction causes the robot to decelerate from the operational speed at or near the re-application position until the robot stops movement at a rest position.

3. A method as set forth in claim 2 further including the step of determining a deceleration distance of the robot representing a distance along the motion segment between the re-application position and the rest position of the robot.

4. A method as set forth in claim 3 further including the step of determining an acceleration distance of the robot representing a distance along the motion segment between the backup position of the robot and the re-application position of the robot.

5. A method as set forth in claim 4 wherein the step of automatically determining the backup distance based on the operational speed of the robot is further defined as determining the backup distance to be at least a sum of the deceleration distance and the acceleration distance to ensure that the robot reaches the operational speed to prevent any gaps or overlaps in the material on the workpiece.

6. A method as set forth in claim 5 wherein the step of relocating the robot to the backup position is further defined as relocating the robot to the backup position based on the sum of the deceleration distance and the acceleration distance.

7. A method as set forth in claim 1 further including the step of moving the robot from the backup position toward the re-application position along the motion segment.

8. A method as set forth in claim 7 wherein the step of moving the robot from the backup position toward the re-application position along the motion segment is further defined as accelerating the robot from the backup position toward the reapplication position such that the robot achieves the operational speed prior to reaching the re-application position.

9. A method as set forth in claim 7 further including the step of applying the second portion of the material to the workpiece at the re-application position after the robot reaches the operational speed.

10. A method as set forth in claim 9 wherein the step of applying the second portion of the material to the workpiece at the re-application position is further defined as opening a material supply valve of the robot at the re-application position after the robot reaches the operational speed to dispense the material from the robot.

11. A method as set forth in claim 1 further including the step of detecting the error that occurs during the application of the first portion of the material as the robot moves along the motion segment.

12. A method as set forth in claim 1 wherein the step of discontinuing the application of the first portion of the material to the workpiece in response to the error is further defined as closing a material supply valve of the robot to prevent the material from being dispensed from the robot in response to the error that occurs during application of the first portion.

13. A method as set forth in claim 1 further including the step of interpolating a plurality of intermediate positions for the robot between the first position and the second position for moving the robot from successive intermediate positions along the motion segment.

14. A method as set forth in claim 13 further including the step of determining a segment fraction value defined as a percentage of the motion segment extending between the first position and the second position.

15. A method as set forth in claim 14 wherein the step of determining the segment fraction value is further defined as determining the segment fraction value at each interpolated intermediate position for the robot.

16. A method as set forth in claim 14 further including the step of establishing a tracking position for the robot along the motion segment in response to the error that occurs during the application of the first portion, wherein the tracking position is an interpolated intermediate position that is interpolated after the time the error occurs.

17. A method as set forth in claim 16 wherein the step of establishing the tracking position for the robot along the motion segment is further defined as recording the determined segment fraction value of the tracking position in response to the error that occurs during the application of the first portion.

18. A method as set forth in claim 17 further including the step of moving the robot from the backup position toward the re-application position along the motion segment.

19. A method as set forth in claim 18 further including the step of monitoring the tracking position as the robot moves from the backup position toward the reapplication position to instruct the robot to begin application of the second portion of the material to the workpiece at the re-application position.

20. A method as set forth in claim 19 wherein the step of monitoring the tracking position is further defined as monitoring the recorded segment fraction value of the tracking position as the robot moves from the backup position toward the reapplication position.

21. A method of controlling a dispensing system having a robot for application of a material to a workpiece wherein the dispensing system prevents any gaps or overlaps in the material on the workpiece, said method comprising the steps of:

moving the robot along a motion segment at an operational speed between a first position and a second position;

applying a first portion of the material to the workpiece as the robot moves along the motion segment;

discontinuing the application of the first portion of the material in response to an error that occurs during the application of the first portion;

establishing a re-application position for the material along the motion segment in response to the error that occurs during the application of the first portion, wherein the re-application position indicates where the robot begins applying a second portion of the material;

establishing a tracking position for the robot along the motion segment in response to the error that occurs during the application of the first portion, wherein the tracking position relates to the re-application position;

automatically determining a backup distance indicating where the robot is relocated relative to the re-application position;

relocating the robot to a backup position based on the determined backup distance;

moving the robot from the backup position toward the re-application position;

said method characterized by monitoring the tracking position as the robot moves from the backup position toward the reapplication position to instruct the robot to begin application of the second portion of the material to the workpiece at the re-application position to prevent any gaps or overlaps in the material on the workpiece.

22. A method as set forth in claim 21 further including the step of interpolating a plurality of intermediate positions for the robot between the first position and the second position.

23. A method as set forth in claim 22 further including the step of determining a segment fraction value defined as a percentage of the motion segment extending between the first position and the second position, wherein the segment fraction value relates to the re-application position.

24. A method as set forth in claim 23 wherein the step of determining the segment fraction value is further defined as determining the segment fraction value at each interpolated intermediate position for the robot, wherein the segment fraction value is defined as the percentage of the motion segment extending between the first position and the second position.

25. A method as set forth in claim 23 wherein the step of establishing the tracking position is further defined as recording the determined segment fraction value of the tracking position, wherein the tracking position is an interpolated intermediate position that is interpolated after the error occurs.

26. A method as set forth in claim 25 wherein the step of monitoring the tracking position is further defined as monitoring the recorded segment fraction value of the tracking position as the robot moves from the backup position toward the reapplication position.

27. A method as set forth in claim 21 further including the step of applying the second portion of the material to the workpiece at the re-application position and after the robot reaches the operational speed as the robot moves from the backup position toward the re-application position.

28. A method as set forth in claim 27 wherein the step of applying the second portion of the material to the workpiece at the re-application position is further defined as opening a material supply valve of the robot at the re-application position and after the robot reaches the operational speed to dispense the material from the robot.

29. A method as set forth in claim 21 further including the step of detecting the error that occurs during the application of the first portion of the material as the robot moves along the motion segment.

30. A method as set forth in claim 21 wherein the step of discontinuing the application of the first portion of the material to the workpiece in response to the error is further defined as closing a material supply valve of the robot to prevent the material from being dispensed from the robot in response to the error that occurs during application of the first portion.

31. A method as set forth in claim 21 further including the step of instructing the robot to stop movement in response to the error, wherein the instruction causes the robot to decelerate from the operational speed at or near the re-application position until the robot stops movement at a rest position.

32. A method as set forth in claim 31 further including the step of determining a deceleration distance of the robot representing a distance along the motion segment between the re-application position and the rest position of the robot.

33. A method as set forth in claim 32 further including the step of determining an acceleration distance of the robot representing a distance along the motion segment between the backup position of the robot and the re-application position of the robot.

34. A method as set forth in claim 33 wherein the step of automatically determining a backup distance to establish where to relocate the robot in relation to the re-application position is further defined as determining the backup distance to be at least a sum of the deceleration distance and the acceleration distance to ensure that the robot reaches the operational speed to prevent any gaps or overlaps in the material on the workpiece.

35. A method as set forth in claim 34 wherein the step of relocating the robot to the backup position is further defined as relocating the robot to the backup position based on the sum of the deceleration distance and the acceleration distance.

36. An intelligent error-recovery method for controlling a system having a robot to ensure that an operational parameter is achieved after an error occurs in the system, said method comprising the steps of:

moving the robot along an operating path between a first position and a second position;

performing an operation with the robot as the robot moves, wherein the operation that is performed requires the operational parameter to ensure that the operation is completed;

discontinuing the operation performed with the robot in response to the error;

establishing a transitional position when the error occurs, wherein the transitional position indicates a location of the robot along the operating path when the error occurs;

relocating the robot to a restart position after the error occurs;

moving the robot from the restart position toward the second position;

said method characterized by verifying that the operational parameter is achieved at least by a time the transitional position is reached by the robot as the robot moves from the restart position toward the second position to ensure that the operation is completed by the robot.

37. A method as set forth in claim 36 wherein the step of verifying that the operational parameter is achieved is further defined as verifying that an operational speed of the robot is achieved at least by the time the transitional position is reached as the robot moves from the restart position toward the second position.

38. A method as set forth in claim 36 further including the step of detecting the error occurring in the system as the robot performs the operation.

39. A method as set forth in claim 38 wherein the step of detecting the error occurring in the system is further defined as detecting the error occurring in the system with a sensor as the robot performs the operation.

40. A method as set forth in claim 36 further including the step of stopping movement of the robot prior to relocating the robot to the restart position.

41. A method as set forth in claim 36 further including the step of interpolating a plurality of intermediate positions for the robot between the first position and the second position for moving the robot from successive intermediate positions along the operating path.

42. A method as set forth in claim 41 further including the step of determining a segment fraction value defined as a percentage of the operating path extending between the first position and the second position.

43. A method as set forth in claim 42 wherein the step of determining the segment fraction value is further defined as determining the segment fraction value of the transitional position.

44. A method as set forth in claim 42 wherein the step of establishing the transitional position is further defined as recording the determined segment fraction value of the transitional position.

45. A method as set forth in claim 44 further including the step of monitoring the recorded segment fraction value of the transitional position as the robot moves from the restart position toward the second position to verify that the operational parameter is achieved at least by the time the transitional position is reached by the robot.

* * * * *